April 15, 1958
W. L. MORRISON
2,830,444
APPARATUS FOR STORING AND UTILIZING VOLATILE
HYDROCARBONS AND THE LIKE
Filed July 17, 1956
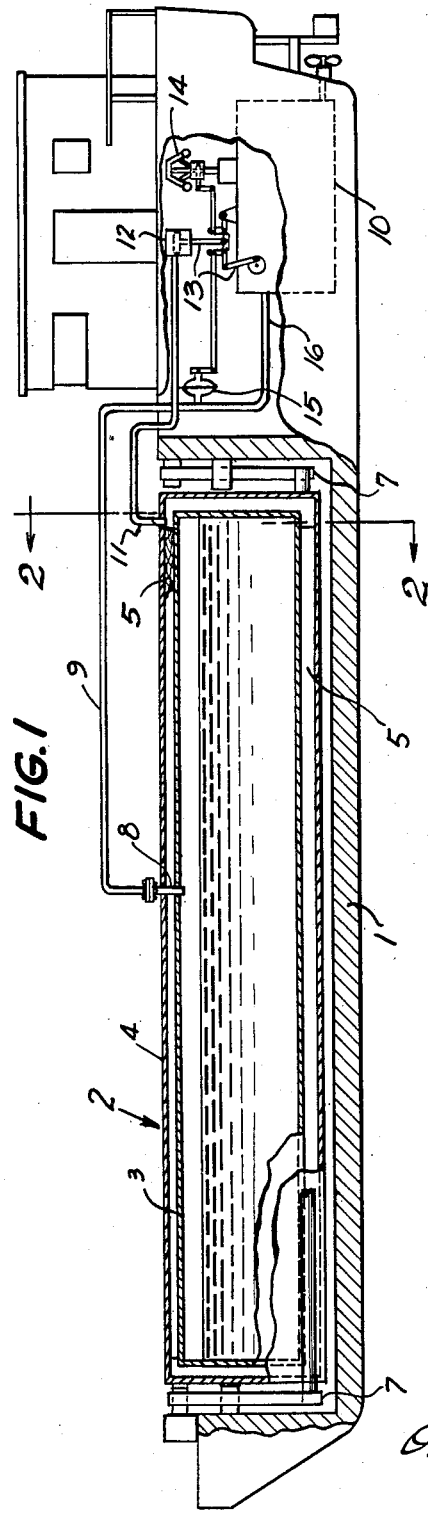
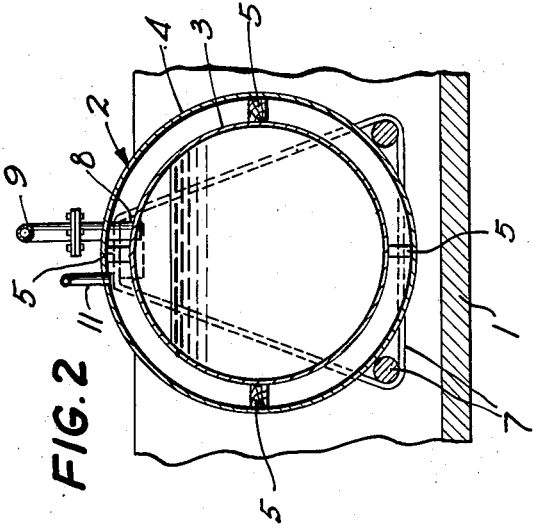
INVENTOR.
Willard L. Morrison
BY
Ooms, McDougall, Williams & Hersh
Attorneys

United States Patent Office 2,830,444
Patented Apr. 15, 1958

2,830,444

APPARATUS FOR STORING AND UTILIZING VOLATILE HYDROCARBONS AND THE LIKE

Willard L. Morrison, Lake Forest, Ill., assignor, by mesne assignments, to Constock Liquid Methane Corporation, Chicago, Ill., a corporation of Delaware Application July 17, 1956, Serial No. 599,675

8 Claims. (Cl. 62—2)

My invention relates to a method and apparatus for storing and utilizing volatile hydrocarbon liquids and the like, and has for one object to provide an apparatus for and a method of controlling the rate of evaporation of chilled liquid gases, such as methane and the like.

This is a continuation-in-part of my copending application Ser. No. 255,701, filed November 9, 1951, and entitled "Method and Apparatus for Storing and Utilizing Volatile Hydrocarbons and the Like."

I have illustrated my invention in connection with the use of methane as motive power for the transmission or shipment of larger quantities of methane, but it will be obvious that the invention is applicable to many other circumstances where a highly volatile gas must be stored or shipped or used.

When a vessel contains such a liquefied hydrocarbon as for example, methane, with temperatures perhaps in the neighborhood of —258 degrees F., the temperature outside the vessel will be much higher than that and even though the vessel is insulated, a certain amount of heat enters the liquid methane and causes evaporation.

The vessel can be insulated to minimize the amount of heat available to vaporize the gas. If it were possible to insulate the vessel so that there would be no entrance of heat whatever, then no vaporization would take place. The more rapid the penetration of heat into the vessel, the more rapid the evaporation of the gas.

Large quantities of this gas can thus be stored without pressure and made available for any suitable use for which such hydrocarbons are appropriate, and it is of the utmost importance to control the rate at which the gas evaporates and is discharged from the receiver, because the gas should be allowed to escape only at the rate at which it is to be used.

If it were possible to enclose the gas in a receiver of sufficient strength, then a reducing valve might be used to control the flow of gas, but the pressure in the receiver under those circumstances would be so high that the receiver would have to be so heavy and pressure resisting as to be utterly impractical.

The solution of the problem which I propose is to control the rate of evaporation by which heat is allowed to enter the vessel. I propose to store the liquid in a king size thermos or vacuum insulated tank which includes two generally concentric air and gas-tight walls with a non-heat conducting structure holding them in fixed relation with one another, such structure being preferably of dry wood, for instance balsam wood and the like, thus greatly strengthening the tank with minimum weight and with great insulation qualities. I propose to evacuate the air from the space between the inner and outer walls so as to provide maximum insulation and minimum heat penetration to the contents of the vacuum insulated tank.

The rate of heat flow from the outside to the contents of the tank will increase with the amount of air contained within the space between the two walls. The greater the vacuum the less the heat flow and I propose to control the rate at which heat reaches the contents of the vacuum insulated tank by controlling the degree of vacuum in the space between the inner and outer walls.

I have illustrated this invention in connection with a shipping receiver in a barge though it might equally well be on a truck or railroad car.

My invention is illustrated more or less diagrammatically in the accompanying drawings, wherein—

Figure 1 is a longitudinal diagrammatic section with parts in elevation of my device;

Figure 2 is a section on an enlarged scale along the line 2—2 of Figure 1.

Like parts are indicated by like characters throughout the specification and drawings.

1 is a barge. 2 is a vacuum insulated receiver tank having an inner wall 3 generally concentric with an outer wall 4, the two walls being spaced apart by a dry, non-conductive wood structure 5. The outer wall 4 is supported on hangers 7 in the barge in such wise as to be freely supported so that distortion of the barge will not distort the receiver tank.

8 is a pipe extending through the outer wall of the tank, communicating with the interior thereof at the top through which the liquid methane or the like may be fed to the tank and through which vaporized gas may be discharged. 9 is a pipe connecting therewith, leading to a prime mover 10 which propels the barge. 11 is a pipe communicating with the space between the inner and outer walls. 12 is a vacuum pump communicating through said pipe with the space between the inner and outer walls of the vacuum insulated receiver. Any suitable means such as a connection to the prime mover indicated at 13 may be used to operate the vacuum pump.

14 is a governor driven by the prime mover. The governor controls the connection between the prime mover and the vacuum pump so as to control the rate of operation of the vacuum pump in consonance with the demand of the prime mover, the idea being that when more methane is required by the prime mover, the vacuum will be reduced so as to permit more heat to enter and vaporize the contents of the vacuum insulated tank and when less methane is required, the vacuum will be raised to reduce the rate of heat entrance.

15 indicates a pressure-responsive member connected by linkage 16 to the drive connection for the pump so that the operation of the pump may be controlled both responsive to the governor 14 and to change in pressure in the pipe, the need for this being that under some circumstances the evaporation rate may be greater or less than that called for by the prime mover for its operation. Under these circumstances, the additional control responsive to variation in the pressure in the pipe 9 will, in cooperation with the governor, maintain the vacuum at a proper point to produce adequate fuel to operate the prime mover and at a point such that the pressure in the inner tank will not reach a dangerous point.

This is just an illustration of the use of a controlled vacuum to control the rate at which methane evaporates from the cold mass contained within the vacuum insulated receiver tank.

The prime mover 10 may be an internal combustion engine in which gas supplied through the pipe 9 is burned or it may include a boiler under which gas is burned to generate the pressure to operate a steam engine. The point is that whatever power means are used and whether they are on the barge or on a towboat associated with the barge, the fuel used to develop the power comes from the mass of cold liquid in the inner tank as that liquid is evaporated.

I propose therefore the storage of liquefied cold hydrocarbons at generally atmospheric pressure. Of course, as evaporation takes place, there will be some increase above atmospheric pressure, increase sufficient to cause the gas to flow out through the pipe 9. So long as the pressure is in the order of ounces rather than pounds the arrangement produces, to all intents and purposes, a storage zone or storage tank at substantially atmospheric pressure.

Instead of making use of the gas volatilized from the liquid in the insulated tank for operation of the prime mover, the volatilized methane gas may be used for other purposes. For example, it may be used as a fuel for the operation of other power-operating equipment. It may be used as a refrigerating medium wherein the cold of the vaporized gas is made available for refrigeration by passing the gas in heat-exchange relation with other materials to be cooled. Such use as a refrigerant can be made separate and apart from, or in combination with, use of the gas as a fuel for the prime mover or other power unit.

Where reliquefaction means are available, the cold gas volatilized in the insulated container may be reliquefied for return to the insulated container or for other use. The self-refrigeration made available by volatilization of the liquefied gas in the insulated container may be utilized as a further means to control the temperature of the liquefied gas in the insulated container.

When used for such other purposes, it remains desirable to control the rate of heat transfer through the evacuated space by variation in the amount of vacuum, as previously described, responsive to the pressure existing in the lines 8 or 9 in communication with the insulated tank, or in response to the demand of the prime mover, or in response to combinations thereof.

It will be understood that other changes may be made with respect to the construction and arrangement of parts and utilization of the volatilized gases made available from the liquefied gas in the insulated tank without departing from the spirit of the invention, especially as defined in the following claims.

I claim:

1. Apparatus for storing of liquid fuels, the temperature of which is substantially lower than the temperature of the ambient air, which consists in an outer gas-tight housing, a substantially non-heat conductive frame structure within the outer housing, an inner gas-tight housing kept out of direct contact with the outer housing and supported by such frame structure, the two housings defining a substantially continuous vacuum chamber enclosing the inner housing and non-heat conductive structure, means for maintaining a variable vacuum within the vacuum chamber, said means including a vacuum pump, conduit means connecting said vacuum pump with said vacuum chamber, a prime mover, a driving connection between it and the vacuum pump and a discharge pipe extending from the inner housing through the vacuum chamber to the prime mover adapted to supply fuel thereto, means responsive to variation in pressure in the pipe leading to the prime mover to control the vacuum pump to vary the vacuum in the vacuum chamber.

2. Apparatus for storing of liquid fuels, the temperature of which is substantially lower than the temperature of the ambient air, which consists in an outer gas-tight housing, a substantially non-heat conductive frame structure within the outer housing, an inner gas-tight housing kept out of direct contact with the outer housing and supported by such frame structure, the two housings defining a substantially continuous vacuum chamber enclosing the inner housing and non-heat conductive structure, means for maintaining a variable vacuum within the vacuum chamber, said means including a vacuum pump, conduit means connecting said vacuum pump with said vacuum chamber, a prime mover, a driving connection between it and the vacuum pump and a discharge pipe extending from the inner housing through the vacuum chamber to the prime mover adapted to supply fuel thereto, means controlled by the prime mover responsive to its fuel demand for controlling the vacuum pump to vary the vacuum in the vacuum chamber.

3. Apparatus for the storage of a liquefied gas at about atmospheric pressure and at a temperature substantially lower than the temperature of the ambient air, which consists in an outer gas-tight housing, an inner gas-tight housing in spaced relation within the outer gas-tight housing, the two housings defining a substantially continuous vacuum chamber therebetween, means for maintaining a variable vacuum within said vacuum chamber to control heat transfer, said means including a vacuum pump, conduit means connecting said vacuum pump with said vacuum chamber, a power operated means and an operative connection between said power operated means and the vacuum pump, a discharge pipe in communication with the interior of the inner housing, and means responsive to the variation in pressure in the discharge pipe to control the vacuum pump to vary the vacuum in the vacuum chamber.

4. Apparatus for the storage of a liquefied gas at about atmospheric pressure and at a temperature substantially lower than the temperature of the ambient air, which consists in an outer gas-tight housing, an inner gas-tight housing with a spaced relation therebetween, the two housings defining a substantially continuous vacuum chamber therebetween, means for maintaining a variable vacuum within said vacuum chamber to control heat transfer through the vacuum chamber for varying the amount of vaporization of the liquefied gas, means utilizing the vapors released from the liquefied gas, said means for maintaining a variable vacuum including a vacuum pump, conduit means connecting said vacuum pump with said vacuum chamber, a power operated means and an operative connection between said vacuum pump and the power operated means, and means responsive to the demand for vapors by said vapor utilizing means for controlling the vacuum pump to vary the vacuum in the vacuum chamber.

5. Apparatus for the storage of a liquefied gas at about atmospheric pressure and a temperature substantially lower than the temperature of the ambient air, which consists in an outer gas-tight housing, an inner gas-tight housing supported within said outer gas-tight housing with a spaced relation therebetween, the two housings defining a substantially continuous vacuum chamber therebetween, means for maintaining a variable vacuum within said vacuum chamber to control heat transfer through the vacuum chamber, said means including a means for drawing a vacuum in said vacuum chamber, a discharge pipe in communication with the interior of the housing, and means responsive to the variation of pressure of the gas within said discharge pipe to vary the vacuum drawn by said vacuum drawing means from the vacuum chamber.

6. Apparatus for the storage of a liquefied gas consisting chiefly of methane at about atmospheric pressure and a temperature of about −258° F., consisting of an outer gas-tight housing, an inner gas-tight housing supported in spaced relation within said outer gas-tight housing, the two housings defining a substantially continuous vacuum chamber therebetween, means for maintaining a variable vacuum within said vacuum chamber to control heat transfer through the vacuum chamber, said means including a means for evacuating the vacuum chamber, a power operated means and an operative connection between said power operated means and said vacuum means, a discharge pipe in communication with the interior of the inner housing, and means responsive to variation of pressure in the discharge pipe to vary the vacuum drawn by the evacuating means from the vacuum chamber.

7. Apparatus for the storage of a liquefied gas consisting chiefly of methane at about atmospheric pressure and a temperature of about −258° F., consisting of an outer gas-tight housing, an inner gas-tight housing supported in spaced relation within said outer gas-tight housing, the two housings defining a substantially continuous vacuum chamber therebetween, means for maintaining a variable vacuum within said vacuum chamber to control heat transfer through the vacuum chamber for varying the amount of vaporization of the liquefied gas, means utilizing the vapors released from the liquefied gas, said means for maintaining a variable vacuum including a means for evacuating the vacuum chamber, a power operated means and an operative connection between said power operated means and said vacuum means, and means responsive to the demand for methane vapor for varying the vacuum drawn by the evacuating means from the vacuum chamber.

8. Apparatus for the storage of a liquified gas at about atmospheric pressure and a temperature substantially lower than the temperature of the ambient air, which comprises in an outer gas-tight housing, an inner gas-tight housing supported within said outer gas-tight housing with a spaced relation therebetween, the two housings defining a substantially continous vacuum chamber therebetween, means for maintaining a variable vacuum within said vacuum chamber to control heat transfer through the vacuum chamber for varying the amount of vaporization of the liquefied gas, means utilizing the vapors released from the liquefied gas, said means for maintaining a variable vacuum including a means for drawing a vacuum in said vacuum chamber, a discharge pipe in communication with the interior of the inner housing, and means responsive to the variation of pressure of the gas within said discharge pipe and responsive to the demand for vapors of said liquefied gas to vary the vacuum drawn by said vacuum drawing means from the vacuum chamber.

References Cited in the file of this patent

UNITED STATES PATENTS

| | | |
|---|---|---|
| 1,521,148 | Dennett | Dec. 30, 1924 |
| 2,538,664 | Benz | Jan. 16, 1951 |
| 2,550,886 | Thompson | May 1, 1951 |

FOREIGN PATENTS

| | | |
|---|---|---|
| 389,535 | Great Britain | Mar. 23, 1933 |